(12) United States Patent  
Fry et al.

(10) Patent No.: US 8,416,235 B2  
(45) Date of Patent: Apr. 9, 2013

(54) METHOD AND SYSTEM FOR PROVIDING TRANSPARENT ACCESS TO HARDWARE GRAPHIC LAYERS

(75) Inventors: Darrin Fry, Kanata (CA); Angela Lin, Kanata (CA); David Donohoe, Ottawa (CA)

(73) Assignee: QNX Software Systems Limited, Kanata, Ontario (CA)

( * ) Notice: Subject to any disclaimer, the term of this patent is extended or adjusted under 35 U.S.C. 154(b) by 0 days.

(21) Appl. No.: 13/326,008

(22) Filed: Dec. 14, 2011

(65) Prior Publication Data

US 2012/0256930 A1     Oct. 11, 2012

Related U.S. Application Data

(63) Continuation of application No. 12/940,162, filed on Nov. 5, 2010, now Pat. No. 8,098,246, which is a continuation of application No. 10/928,698, filed on Aug. 30, 2004, now Pat. No. 7,830,372.

(51) Int. Cl.  
*G06T 15/00*     (2011.01)

(52) U.S. Cl.  
USPC ........... 345/419; 345/418; 709/224; 711/100; 711/154; 719/312; 719/318; 719/328

(58) Field of Classification Search .................. 345/418, 345/419; 709/224; 711/100, 154; 719/312, 719/318, 328  
See application file for complete search history.

(56) References Cited

U.S. PATENT DOCUMENTS

| | | | |
|---|---|---|---|
| 5,734,852 A | 3/1998 | Zias et al. | |
| 5,745,759 A | 4/1998 | Hayden et al. | |
| 6,397,262 B1 | 5/2002 | Hayden et al. | |
| 6,448,958 B1 | 9/2002 | Muta | |
| 6,832,266 B1 | 12/2004 | Shaylor | |
| 7,830,372 B2 * | 11/2010 | Fry et al. | ........................ 345/419 |
| 8,098,246 B2 * | 1/2012 | Fry et al. | ........................ 345/419 |
| 2004/0255253 A1 | 12/2004 | Marcjan | |

OTHER PUBLICATIONS

"Giant Step for Software Developers," dated Apr. 2002, pp. 1, Issue, Apr. 2002, Bosch, Bosch Research Info.

Foster, Scott, "'Telematics' Brings Latest Technology Into Cars," dated Nov. 3, 2003, p. 13, Ottawa Business Journal.

"Linux + Java Turbocharge 'Super8 Hemi' Concept Car," dated Jan. 9, 2001, pp. 1-3, available at wvvw.linuxdevices.com.

"Telematics/Entertainment Controller," dated Oct. 14, 2003, pp. 1-2, available at www.altera.com/solutions/auto/controller/aut-telematics_controller.html.

"Telematics/Entertainment System," dated Oct. 14, 2003, pp. 1-2, available at www.altera.com/solutions/auto/system/aut-telematics_system.html.

(Continued)

*Primary Examiner* — Phu K Nguyen  
(74) *Attorney, Agent, or Firm* — Brinks Hofer Gilson & Lione (57) ABSTRACT

A software application and an operating system may run on a computer, which includes a graphics card and a video display, where the graphics card is operable to render images to the video display, and the operating system includes a universal application programming interface (API) which supports hardware layers on graphics cards. The operating system may be operable to receive draw events via the universal API; determine what hardware layers are available on the graphics card, and what their parameters are; and respond to draw requests from the software application by rendering the draw requests selectively to any of the available hardware layers on the graphics card.

15 Claims, 7 Drawing Sheets

OTHER PUBLICATIONS

McHugh, Patty, "Speech and the Automobile," dated Nov./Dec. 2002, pp. 1-2, Speech Technology Magazine, available at www.speechtechmap.com.

"Telematics: Microsoft Car .NET Hits the Road," dated Nov. 16, 2000, pp. 1-2, available at www.accenture.com.

Dunne, Danielle, "What is Telematics?," dated May 24, 2001, pp. 1-2, Darwin Magazine, available at www.darwinmag.com.

"More Comfort with Bluetooth," dated Apr. 2002, pp. 1-3, Issue Apr. 2002, Bosch, Bosch Research Info.

Arato, Judith et al., "The Evolution of Jini ™ TM Technology in Telematics," dated Oct. 2001, pp. 1-18, PsiNaptic Inc.

"The eGasStation Architecture," dated 2001, pp. 1-18, Sun Microsystems, Inc., Palo Alto, CA.

"What is DirectFB?," dated Jan. 31, 2006, pp. 1, DirectFB, available at www.directfb.org.

Hundt, Andreas, "DirectFB Overview (v0.2 for DirectFB 0.9.21)," dated Feb. 19, 2004, pp. 1-13, Andreas Hundt <andi@convergence.de>.

"Linus Powers First Car with Integrated UMTS Services," dated Jun. 14, 2002, pp. 1-2, LinuxDevices, available at www.linuxdevices.com.

O'Donnell, Jayne, "Advances in Car Technology Bring High-Class Headaches," dated Nov. 2003, pp. 1-3, USA Today, available at http://usatoday.printthis.clickability.com.

\* cited by examiner

METHOD AND SYSTEM FOR PROVIDING TRANSPARENT ACCESS TO HARDWARE GRAPHIC LAYERS

This application is a continuation application of, and claims priority under 35 U.S.C. §120 to, U.S. patent application Ser. No. 12/940,162, "METHOD AND SYSTEM FOR PROVIDING TRANSPARENT ACCESS TO HARDWARE GRAPHIC LAYERS," filed Nov. 5, 2010, the entire contents of which are incorporated by reference, which issued as U.S. Pat. No. 8,098,246 and which is a continuation application of, and claims priority under 35 U.S.C. §120 to, U.S. patent application Ser. No. 10/928,698, "METHOD AND SYSTEM FOR PROVIDING TRANSPARENT ACCESS TO HARDWARE GRAPHIC LAYERS," filed Aug. 30, 2004, the entire contents of which are incorporated by reference, which issued as U.S. Pat. No. 7,830,372.

The present invention relates generally to computer graphics, and more specifically to methods of, and systems for, configuring, controlling and accessing multiple hardware graphics layers that are used to compose a single video display.

BACKGROUND OF THE INVENTION

Windows-type operating systems allow users and developers to interact with software applications via a consistent graphical user interface (GUI), while at the same time providing them with the ability to interact with multiple software applications simultaneously. Ideally, an operating system should provide access to as much of the underlying graphical hardware's capabilities as possible while maintaining a consistent API (application program interface). An operating system API is the set of routines, protocols, and tools that make up the interface between the operating system and the software applications that access it. Any interaction between a software application and the operating environment (i.e. video display, hard drive, keyboard, etc.) is done through the operating system API.

Additionally, the operating system should support a degree of feature transparency. That is, a software application should be able to benefit from a system feature without requiring the software application to be aware of every detail of the system feature. For example, a software application designed on a system with a 16 bit colour depth display should run as intended on a system with a 32 bit colour depth display. The software application should not need to know the supported colour depth of the video display it is running on. The greater the degree of feature transparency provided by an operating system, the greater the ease of developing software applications that can run in a variety of environments and the greater the selection of software applications available to use with any given platform.

Video Memory, Video Surfaces and Layers

Personal computers and other computing devices generally include a circuit board referred to as a graphics card, video, card or video board, which allows the personal computer to drive a physical display such as an LCD (liquid crystal display) or a CRT (cathode ray tube) monitor. These graphics cards typically contain their own video memory, so that the computer's RAM (random access memory) is not needed for storing video display data. Many graphics cards also have their own on-board microprocessor so that the processing required to render graphics can be performed very quickly and without being a burden to the main microprocessor of the computer.

Graphics cards typically have much more video memory than needed to store the contents of a single display screen. The contents of the video memory is partitioned into chunks which can be dynamically defined and redefined, each chunk having a specific width, height and other characteristics. Each chunk is referred to as a video "surface", one of these video surfaces being treated as the primary display. Drawing to the video surface associated with the primary display will yield visible graphics on the physical display. Drawing to video surfaces other than the primary display will not be visible unless the contents of those surfaces are "blitted" to the primary display's video surface.

"Layers" hardware allows a graphics card to have one or more video surfaces as part of the primary display. The way the various video surfaces are combined and/or blended to create the primary display is configurable via the layers hardware on the graphics card. The layers hardware combines all the surfaces targeted at the primary display non-destructively. That is, the contents of the various video surfaces are not affected by the layering hardware—only the end result visible on the display device is affected. This makes graphics cards with layering hardware Ideal for low performance platforms that require sophisticated graphics composition such as automotive telematics systems, where, for example, it might be desirable to display the settings of ventilation systems over a road map or video programming while it continues to play.

"Automotive telematics systems" refers to the technology of computerized control systems to manage environmental and entertainment systems in automobiles. These systems are also referred to as automobile "infotainment" or "infotronic" systems, or by other similar names. Some of the functionality that such systems may manage includes:

1. supporting entertainment applications such as broadcast radio, video games and playing movies. These entertainment applications can be selectively directed towards different display, speaker and headphone systems in the vehicle;
2. managing vehicle climate control systems;
3. providing Internet access, email and instant messaging services;
4. providing security systems such as anti-theft and automatic dialling;
5. interfacing and synchronizing with portable computing devices such as personal digital assistants (PDAs), laptop computers and notebook computers;
6. displaying electronic road maps, using GPS (global positioning system) technology to select the correct map and to identify the vehicle's actual position on the map. This technology can also be used to advise the user of nearby service stations, restaurants and the other services, provide traffic information, navigation advice and parking availability; and
7. interacting wirelessly with gas station "point of sale" and associated automated banking services; for example, allowing users to purchase gasoline, have their car washed and download movies without having to interact with a live attendent (see for example, "*The eGasStation Architecture—Java™ Technology Based Managed Services for Retail Service Stations*" by Sun Microsystems, Inc. 2001).

This listing is just a small sample of what automobile telematics systems may be designed to support. Additional services will surely be supported by telematics systems over time.

Existing Video Systems

There are two common configurations of video systems in the art.

In one system, a software application draws images, vectors and characters using an API of the operating system which directly manipulates the memory and registers of the graphics card, to affect a display. The software application uses the operating system API, but the software application itself acts as a graphics driver directly manipulating the hardware. In such a system only one software application has access to the graphics card at one time due to hardware contention issues.

In the other system, the software application draws using an API of the operating system which packages and sends out the draw requests. If the packaged draw requests are delivered to a software application that is using an API of the operating system to manipulate the memory and registers of the graphics card to affect a display, those draw requests are rendered to the graphics card and may affect the visible display. In this configuration, the drawing applications and the graphics drivers are separate software processes allowing multiple applications to draw using a single graphics card. The mechanism for delivering the packaged draw requests varies within windowing systems known in the art.

Figure 1:
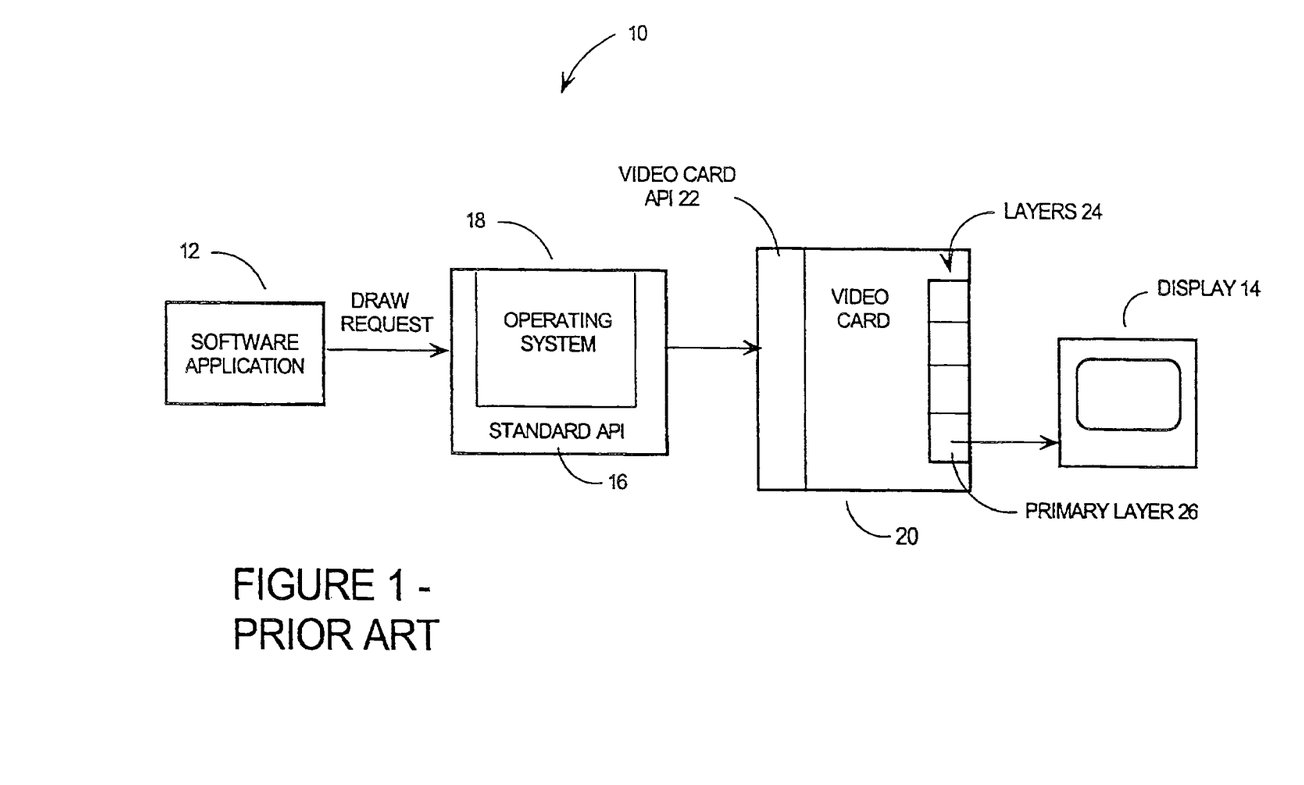
FIG. 1 presents a block diagram of a computer system with video layers support as known in the art.

FIG. 1 presents a block diagram of a typical arrangement for a graphics card with layers support 10, as known in the art. When a software application 12 wishes to draw an image, character or vector to the display screen 14, it sends a "draw" request to the API 16 of the operating system 18. The operating system 18 processes the draw request and sends appropriate instructions to the graphics card 20. These instructions are sent via the operating system API 16, and the API 22 of the graphics card 20. Because the operating system 18 has no knowledge of the hardware layers 24 in the graphics card 20, all draw requests are simply going to be passed to the same layer, the primary layer 26. The video image within the primary layer 26 is then passed on to the display screen 14.

If the software application 12 has special knowledge of the API 22 of the graphics card 20 and the rest of the system allows it, then the software application 12 can pass messages directly to and from the graphics card 20 to manipulate the memory and registers of the graphics card 20 (this is the first method described above). Alternatively, if the operating system 18 has a graphics driver with special knowledge of the API 22 of the graphics card 20 and the rest of the system allows it, then the graphics driver in the operating system 18 could manipulate the layers capabilites of the graphics card 20 (this is the second method described above).

APIs to access and control video hardware layers were first provided by graphics card manufacturers who were producing graphics cards with layers support. However, there were at least two major problems with these early APIs:
1. the APIs from different manufactures bore little resemblance to one another, meaning that a software application that needed to access and control the layers feature of a graphics card would work only on one manufacture's graphics card; and
2. windows-type operating systems were completely unaware of the existence of the video hardware layers, so the layers could not be accessed via the operating system API.

More recently an operating system API became available which presented a consistent but limited interface to hardware layering capabilities, although it was still necessary for a software application to use this specific operating system API to be able to render to the layers supported by the hardware. This limitation made the integration of third party software into a layer-enabled system impossible. In other words, this new operating system API still requires that third party software applications know that the new operating system API has access to the hardware layers, and know how to use it. Typically, third party software applications do not have this knowledge, so this is not a "transparent" solution.

One such API is "DirectFB"—an API which provides generic access to video layers capabilities in a limited fashion. DirectFB is limited to exclusive use of surfaces, with the ability to share the primary display surface to a degree.

Existing operating system APIs that allow a software application to have direct access to a graphics hardware layer, generally preclude that layer from being shared by multiple software applications due to hardware contention issues.

Demand has grown in the automotive, medical instrumentation, consumer, and industrial automation markets for a graphics solution which allows the use of third party software applications, legacy applications, and new software applications that were targeted at more than one project, to be able to leverage the layering capabilities of the chosen graphics hardware.

There is therefore a need for an integrated approach to configure, control, and access (render to) graphical hardware layers which addresses the problems outlined above. The approach chosen must take into account the needs of the target markets:
  Automotive: Very size and performance sensitive
  Consumer: Very size and performance sensitive
  Medical: Very performance sensitive
  Industrial Automation: Very performance sensitive
This design must also be provided with consideration for speed of execution, reliability, complexity and scalability.

SUMMARY OF THE INVENTION

It is therefore an object of the invention to provide a novel method and system of computer file management which obviates or mitigates at least one of the disadvantages of the prior art.

One aspect of the invention is broadly defined as, in a computer environment including a software application and an operating system running on a computer, said computer including a graphics card and a video display, said graphics card being operable to render images to said video display, the improvement comprising: said operating system including a universal application programming interface (API) which supports hardware layers on graphics cards; said operating system being operable to: receive draw events via said universal API; determine what hardware layers are available on said graphics card, and what their parameters are; and respond to draw requests from said software application by rendering said draw requests selectively to any of said available hardware layers on said graphics card; whereby said computer environment allows software applications to exploit available hardware layers on said graphics card.

In the preferred embodiment of the invention, a mechanism is provided which allows the windowing environment and layers hardware to be configured such that software applications that do not know about video layers can, in fact, render to layers. That is, software applications can render to layers without using the video layers APIs at all and not using any special draw commands. This mechanism allows the use of unmodified legacy applications in a layered environment.

BRIEF DESCRIPTION OF THE DRAWINGS

These and other features of the invention will become more apparent from the following description in which reference is made to the appended drawings in which.

DESCRIPTION OF THE INVENTION

Generally speaking, the invention addresses the problems in the art by providing an operating system which:
1. has a universal API which supports hardware layers on graphics cards;
2. determines what layers are available on the graphics card in use, and what the parameters of those layers are; and
3. reacts to draw requests from software applications by exploiting the available video layers.

This system provides feature transparency for rendering to graphical hardware layers. A number of embodiments of the invention are described herein, but clearly the invention can be implemented in many different ways. The block diagram of FIG. 2 presents an overview of a typical system employing the invention.

Figure 2:
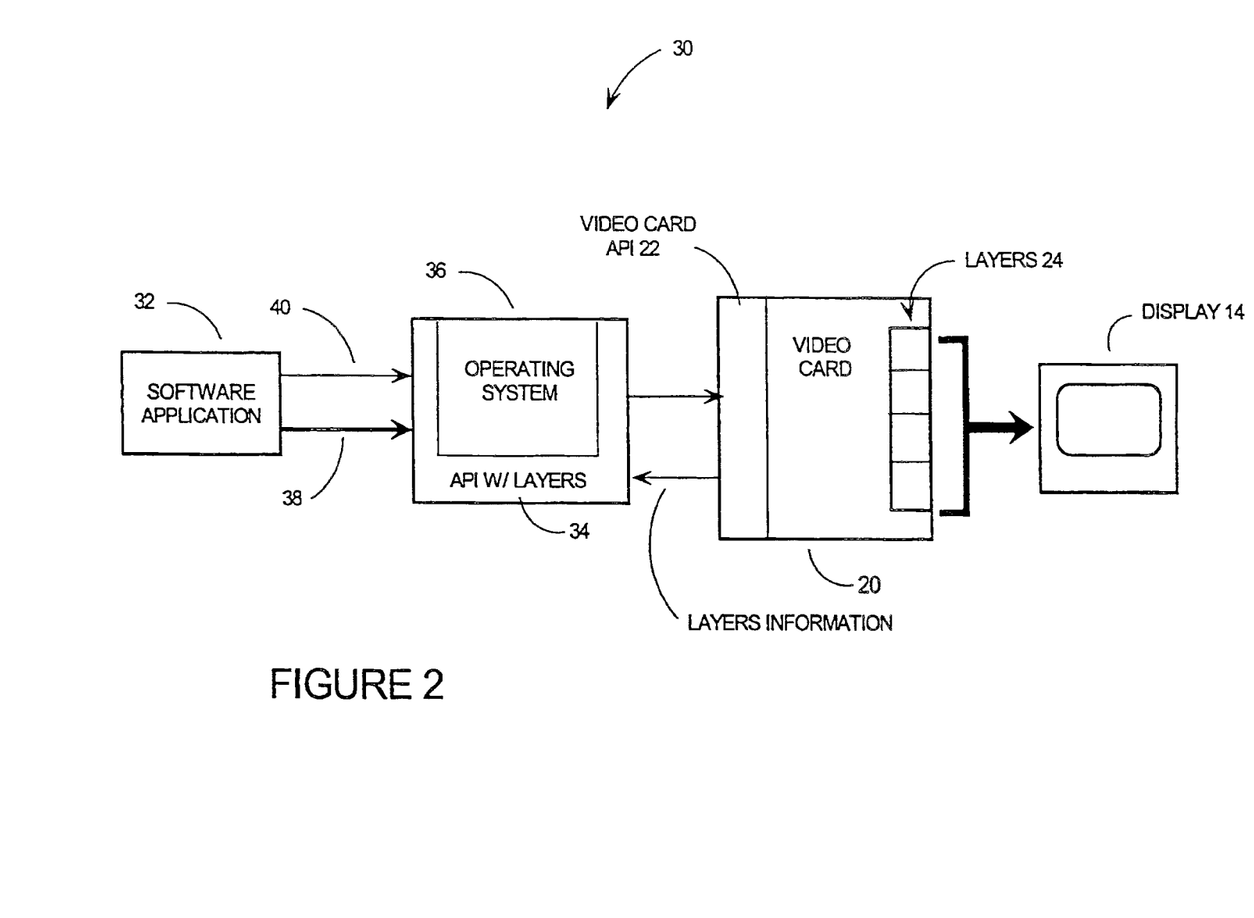
FIG. 2 presents a block diagram of a computer system with video layers support in an embodiment of the invention.

The block diagram of FIG. 2 may be contrasted to that of FIG. 1. In the case of FIG. 2, when a software application 32 wishes to draw an image, character or vector to the display screen 14, it may or may not have knowledge of the layers support available. Thus, the system 30 supports two different types of draw requests to the API 34 of the operating system 36: requests which include hardware layer information 38, and those which do not 40.

The operating system 36 of the invention has an API 34 which supports targetting draw requests to video surfaces (which can be associated to layers) 38, but also supports non-targetted draws. In order to support legacy third-party software applications, the operating system 36 must handle non-layers type requests 40 in the traditional manner. Alternatively, two classes of draw API could be defined: the traditional API which would provide a non-targetted and thereby non-layer capable API, and a surface or layer draw API which would provide direct access to video surfaces and thus layers.

The operating system 36 also has some means of determining what layers are available on the graphics card 20. This knowledge could be transferred from the graphics card 20 to the operating system 36 in various ways, for example: on each boot-up, as part of the system installation, or via hard-coding. Operating systems 36 are typically designed to include software "drivers" which are specific to output devices such as graphics cards. When a user installs a new graphics card, part of the installation procedure will include the loading of the graphics cards driver onto the system. These drivers are generally specific to the particular operating system, and make and model of graphics card. Drivers are often distributed with the graphics cards on CD-Roms, but are also generally available online.

Note that the invention does not require any changes to the graphics card 20 and display 14 as described with respect to FIG. 1. The software application 32 may also be the same as the software application 12, if it does not have knowledge of the available layers and the capability to request that certain video hardware layers be used.

On receipt of a draw request, the operating system 36 processes the request and sends appropriate instructions to the graphics card 20 via the API 34 of the operating system 36 and the API 22 of the graphics card 20. Unlike the system of FIG. 1, where the operating system 36 has no knowledge of the hardware layers 24 in the graphics card 20, the operating system 36 in the case of the invention does have knowledge of the hardware layers 24 and also has a driver within the API 34 which is complementary to that of the graphics card 20. Thus, draw requests are directed to the layer determined by the operating system 36—in some cases this video hardware layer will be determined by the software application 32 wishing to draw an image, character or vector, but in other cases the determination will be made by the operating system 36 itself using the geometry of the emitted events, the geometry of draw sensitive regions and the priority of the data. This allows the control of what elements are delivered to which regions positionally.

A typical example would, for example, have alert renderings occurring positionally under a region associated with a layer that has priority over other video surfaces, ensuring the alerts are visible over all other content, climate data or a movie being shown in the composited display.

These layers of images are all stored separately on the graphics card 20 and are composed non-destructively into a single composite image. The composite video image is then sent by the graphics card 20 to the display screen 14 for presentation.

The system of the invention allows graphics card hardware layers to be exploited by any third-party applications software, regardless of whether it has knowledge of the underlying hardware layers. It also provides a uniform interface, so that software applications do not have to be aware of the specifics of a particular graphics card. Other advantages of the invention will be clear from the more detailed description of the invention which follows.

The preferred embodiment of the invention will be described with respect to the Photon™ Windowing System running over the QNX™ RTOS (real time operating system) though the invention could be implemented on virtually any operating system. Variations necessary to apply the invention to other operating systems would be clear to one skilled in the art from the description herein.

Figure 3:
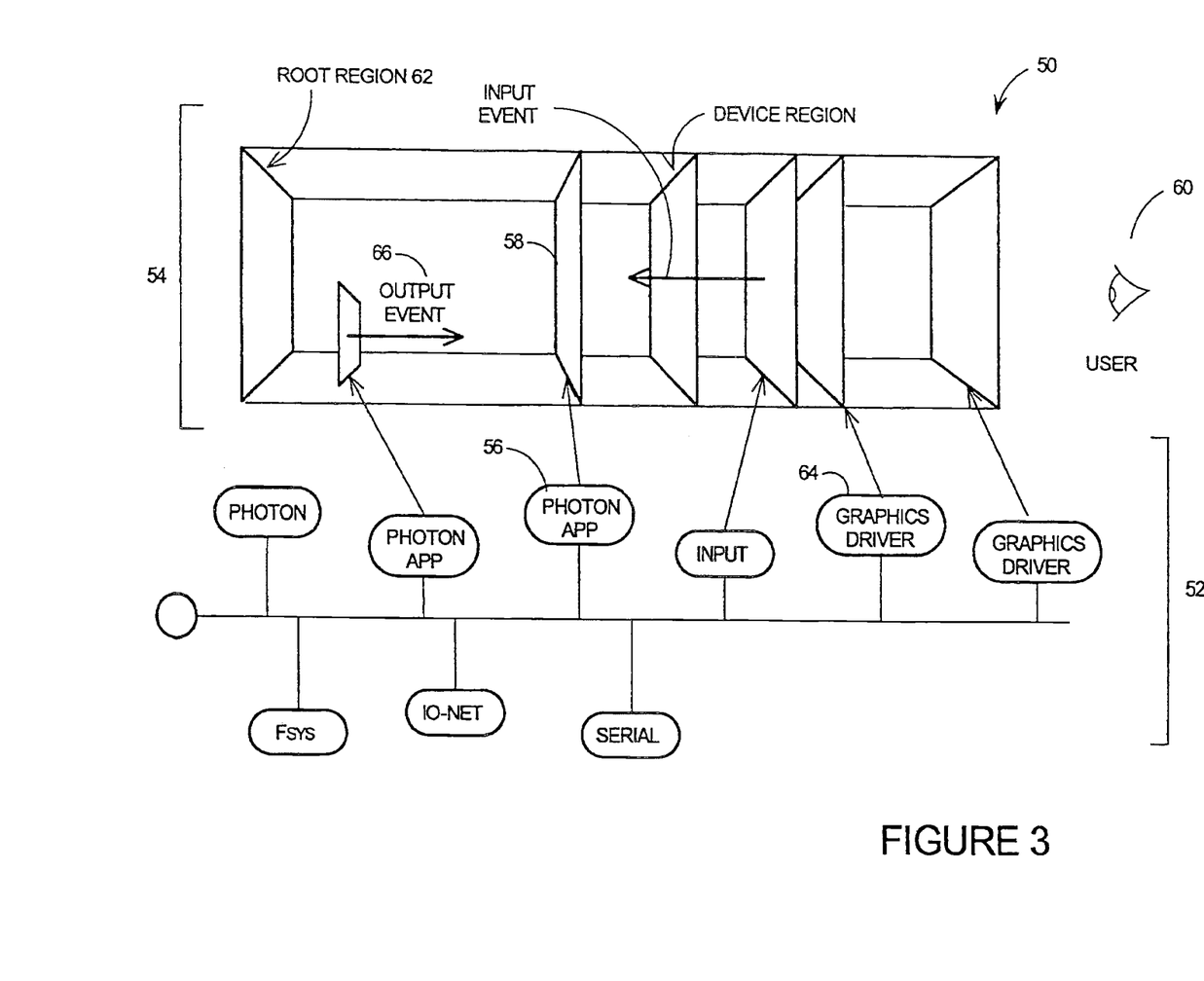
FIG. 3 presents a symbolic visualization of the Photon™ Event Space and the QNX™ operating system environment in an embodiment of the invention.

A symbolic visualization of the Photon event space and the QNX operating system environment 50 in an embodiment of the invention, is presented in FIG. 3.

The QNX operating system is a "message passing operating system". This means that all of the software including software applications, the operating system itself and windows GUI (graphic user interface) software, run as separate software processes on the system. These software processes are depicted as blocks in section 52 of FIG. 3. Message passing is the fundamental means of interprocess communication (IPC) between these software processes. A message is a packet of bytes passed from one process to another with no special meaning attached to the content of the message. The data in a message has meaning for the sender of the message and for its receiver, but generally for no one else.

The Photon environment 50 provides a three dimensional virtual "Event Space" 54 where the user 60 can be imagined to be outside of this space, looking in. The Photon environment 50 confines itself only to managing "Regions" owned by application programs, and performing the clipping and steering of various "Events" as they flow through the Regions in this Event Space 54. Software applications can place regions into this Event Space 54, which are sensitive, opaque, or both to various types of events which may be passed through.

Software applications can exert an influence on the Photon environment 50 through one or more of these rectangular Regions, which are owned by the respective software processes themselves. For example, a particular Photon application 56 may generate a Region 58. Regions can also emit and collect objects called Events. These Events can travel in either direction through the Event Space 54 (i.e. either toward or away from the user 60). As Events move through the Event Space 54, they interact with other Regions—this is how software applications interact with each other. Regions are stationary, while Events move through the Event Space 54.

As an Event flows through the Event Space 54, its rectangle set intersects with Regions placed in the Event Space 54 by other software processes. As this occurs, the operating system adjusts the Event's rectangle set according to the attributes of the Regions with which the Event intersected.

Events come in various classes and have various attributes. An Event is defined by an originating Region, a type, a direction, an attached list of rectangles and optionally, some Event-specific data. Events are used to represent the following:
key presses, keyboard state information;
mouse button presses and releases;
pointer motions (with or without mouse button(s) pressed);
Region boundary crossings;
Regions exposed or covered;
drag operations; and
drawing functions.

The normal operation of a graphics driver 64 is to create a region in Photon's event space 54 with the same dimensions as the physical display device 14 and sensitivity to draw events. Any software application that emits a draw event (for example, output event 66) from the area underneath the graphics driver's region will have its events intersect with the graphics driver's region and the event's data will be delivered to the graphics driver. The graphics driver 64 uses the data from the draw event (photon draw stream) to render the desired graphics to the video hardware 20, and on to the physical display device 14.

A Region has two attributes which control how Events are to be treated when they intersect with a Region: Sensitivity and Opacity. If a Region is sensitive to a particular type of Event, then the Region's owner collects a copy of any Event of that type which intersects with the Region. The sensitivity attribute neither modifies the rectangle set of an Event nor does it affect the Event's ability to continue flowing through the Event Space. Regions which are opaque to a specific Event type block portions of that type of Event's rectangle set from travelling further in the Event Space. If a Region is opaque to an Event type, any Event of that type which intersects with the Region has its rectangle set adjusted, to clip out the intersecting area. If the Event is entirely clipped by the intersection of an Opaque Region, the draw Event will cease to exist.

The following table summarizes how a Region's attributes affect Events that intersect with that Region:

| If the Region is: | then the Event is: | and the rectangle set is: |
|---|---|---|
| Insensitive, Transparent | ignored | unaffected |
| Insensitive, Opaque | ignored | adjusted |
| Sensitive, Transparent | collected | unaffected |
| Sensitive, Opaque | collected | adjusted |

By placing a Region across the entire Event Space, a process can intercept and modify any Event passing through that Region. If a Region is Sensitive and Opaque, it can choose to re-emit a modified version of the Event.

A special Region called the root Region 62 is always the Region furthest away from the user 60. All other Regions descend in some way from the root Region 62. Once an Event travelling away from the user 60 reaches the root Region 62, it ceases to exist.

The current invention extends this concept to allow software applications to render to "off screen contexts" or "video surfaces" that do not have physical representation in Photon's event space. To achieve this, an identifier provided by the graphics driver at the time the video surface was created, is inserted into the draw stream that uniquely identifies that video surface. The graphics driver can then render draw requests directly into the video surface identified.

In other words, a software application can launch a software process which emits an output event in the Photon event space 54. This output event can include an identifier which indicates which video layer the output event is to be directed to. The graphics driver responds to the existence of the identifier by generating the requested video surface, including the video surface identifier, in order to render into that surface.

The events containing draw streams to be targeted at specific video surfaces may be emitted directly to the graphics driver's region. In other words, the draw stream targeted at a particular video surface could be given directly to the graphics driver without traveling through the Photon event space 54, eliminating the possibility of a region blocking some or all of the draw event's rectangles.

To provide transparent access to hardware layers, two ideas were combined:
1. the facility for a graphics driver to create a driver region in Photon's event space 54 that would have any draw stream collected on that region rendered to a video surface was added (i.e. the driver region acts like a collector, events that match its sensitivity are delivered to the graphics driver); and
2. the ability to associate an off screen context or video surface to the layer hardware on the graphics card was also added.

By providing an API and supporting driver that allows software applications to query the number of available hardware layers, determine what capabilities each hardware layer supports, create off screen contexts/video surfaces which match any restrictions imposed by the hardware layers, request that a driver region be created in Photon space targeting that surface, and finally, associate the surface to a facet of the layering hardware and configuring the layering hardware's capabilities, any software application can be given access to a layer without having to modify the software application in any way and without the software application even knowing the video hardware layers exist.

A configuring application sets up the video surfaces, driver regions, surface to layer associations, and layer attributes. Once done, any software application that is positioned under the driver regions the configuring application requested, will render to the surface targeted by that driver region and subsequently to the primary display through the layering hardware.

Figure 4:
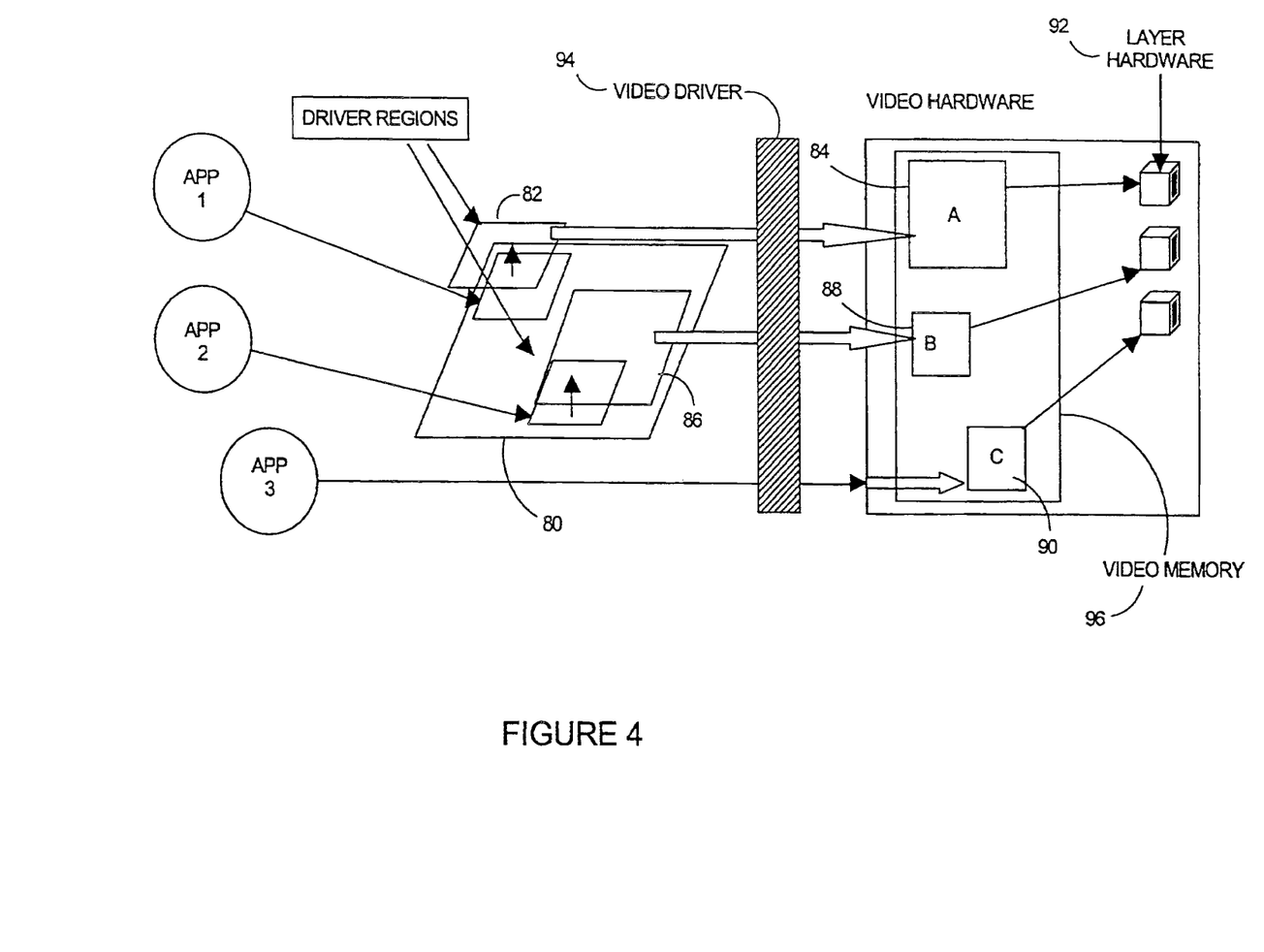
FIG. 4 presents a symbolic visualization of a modified Photon Event Space supporting video hardware layers management, in an embodiment of the invention.

FIG. 4 presents an exemplary graphic representation of this concept. Note that:
a layer will composite the contents of a video surface it is associated with, to the primary display (recall that a video surface is a software entity managed on the operating system side of the system, while a layer is a firmware entity on the graphics card);
a video surface may or may not be associated with a layer;

software applications can emit draw streams that are targeted at a particular video surfaces or draw streams that have no regard for the existence of multiple video surfaces;

if the draws are not targeted at a specific video surface, the event flows through Photon event space and will be collected by any regions sensitive to draw that the events intersect; and if draws are targeted at a particular video surface, the draw event is delivered directly to a region created by the driver that owns the targeted video surface, bypassing the normal event propagation through the Photon Event Space in which other regions could block or modify the draw event.

Multiple driver regions can be put into Photon's event space by a single driver, which targets video surfaces other than the one associated with the primary display. This in effect causes any software application below that region to render to the video surface the driver region is associated with—without the software application knowing where the draws are ultimately going.

If such a region is targeting a video surface that is associated with a layer, the draw commands from the software applications below the driver region will be rendered to the video surface and composited by the layer.

So, software applications do not explicitly render to a layer; they render either through Photon space to whomever catches the draws, or to a specific video surface. The fact that a video surface has been associated with a layer does not effect the commands/API that a software application uses when drawing.

In FIG. 4, software application APP 1 is drawing through Photon event space 80. Its draws happen to intersect with a driver region 82 that is targeting the video surface 84 associated with the primary display (the top hardware layer on the graphics card). That is, any draw events that the video driver 94 receives from region 82 will be rendered to surface 84.

Software application APP 2 is drawing the same way that APP 1 is, but its draws intersect a driver region 86 that is targeting, or associated with, video surface 88. This video surface 88 is associated with another layer on the graphics card.

Software application APP 3 draws using the same drawing API as applications APP 1 and APP 2, but APP 3 has intentionally set its draw target to be video surface 90. The mechanism employed has APP 3's draw stream sent directly to the primary surface region. The draw stream has an identifier informing the collector of the event, the graphics driver, that the draw stream should be rendered to video surface 90 in this case. In FIG. 4, video surface 90 is associated with the third layer.

Note again, that the software applications are rendering to video surfaces, not specifically to layers on the graphics card. Video surfaces 88 and 90 could just as easily have had no layer association at all. For the contents of those surfaces to be seen in that case, they would have to be blitted to the layer associated with video surface 84.

The layer hardware 92 on the graphics card manipulates the video surfaces 84, 88, 90 and pulls them into the graphics pipeline to generate a composite display that is seen on the physical display device 14. The video surfaces 84, 88, 90 are simply defined regions in the video memory 96 of the video hardware, as known in the art.

Draw instructions generated by the software processes of third party software applications can thus be positioned in any of these video surfaces 84, 88, 90 and processed accordingly.

In the preferred embodiment of the invention, the configuration of the video layers and graphic driver regions in the Photon Event Space shown in FIG. 4 is generated by a separate software process called a "configuring application". This configuring application could, for example, perform the steps presented in the flow chart of FIG. 5 to set up this environment.

Figure 5:
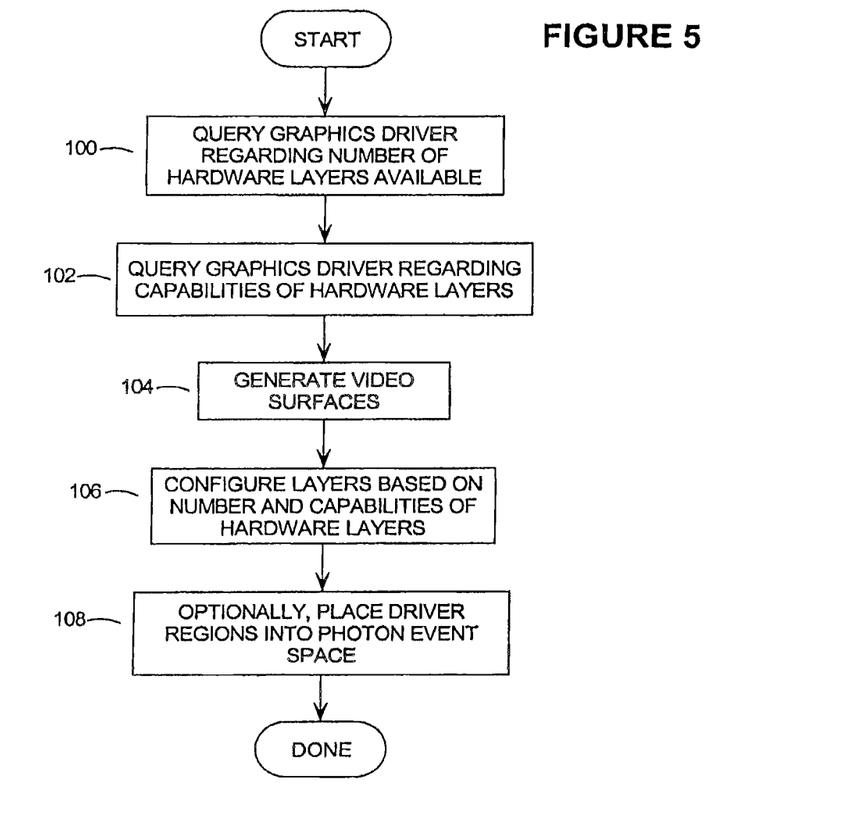
FIG. 5 presents a flow chart of a method of configuring video layers support, in an embodiment of the invention.

At step 100, the configuring application queries the graphics driver for a particular physical display device 14, for the number of available hardware layers. The graphics driver is dedicated to the particular graphics card 20, but all Photon drivers that have layers support, have the same interface for query and control of the layers hardware.

The configuring application then queries the graphics driver at step 102, for the capabilities of each video layer. This information will contain such parameters as the dimensions of each video layer, the number of colours, dimensions, resolution, scale factors, virtual dimension limits, chroma-key, alpha blending capabilities, and other parameters per the specific environment.

Armed with this information from the graphics driver, the configuring application then generates the required number of video surfaces (called "off screen contexts" in Photon) at step 104, and configures the corresponding layers based on the number of, and capabilities of, the available hardware layers, at step 106.

The configuring application then optionally places those driver regions into the Photon Event Space 80 at step 108. This step is optional because it may not be desirable to place all of the driver regions in the Photon Event Space 80 (the lack of a driver region within the photon space for a video surface prevents software applications that do not have specific intent to render to that surface, from doing so inadvertently). As noted above, it may be desirable to send some draw requests directly to a particular video layer without having to pass through the Photon Event Space 80, avoiding the possibility that certain draw requests might be modified or blocked by other Regions.

It might be desirable, for example, to configure a layer to present alarm conditions to the user. This layer could be set up outside the Photon Event Space 80 to guarantee that these alarm conditions will be presented to the user 60 regardless.

At this point, the system is now configured to exploit the hardware layers capabilities of the graphics card.

The configuring application can then terminate, leaving the Photon system configured as above. Any third party software applications that are positioned under the graphic driver regions targeted at a video surface associated with a layer will in effect render to that layer. The third party software applications do not need any knowledge that the layers even exist so need no modifications whatsoever to render in a multi-layered system.

At this point, any application which renders from below a driver region which is connected to a video surface associated with a layer will be rendering into that layer and the hardware will composite the result of the rendering into the final display based on the configuration of the layer's attributes.

It should be noted that any software application which renders from below a driver region which is connected to a video surface, will be rendering into that video surface. It is not necessary that the video surface also be connected to layering hardware. For example, a screensaver could request a driver region be created at 1024,768 to 2047,1535 and associate that region to a video surface that it will manipulate and display at 0,0. The result would be the screensaver using content from software applications on console 5, assuming a resolution of 1024×768, to generate its display.

Figure 6:
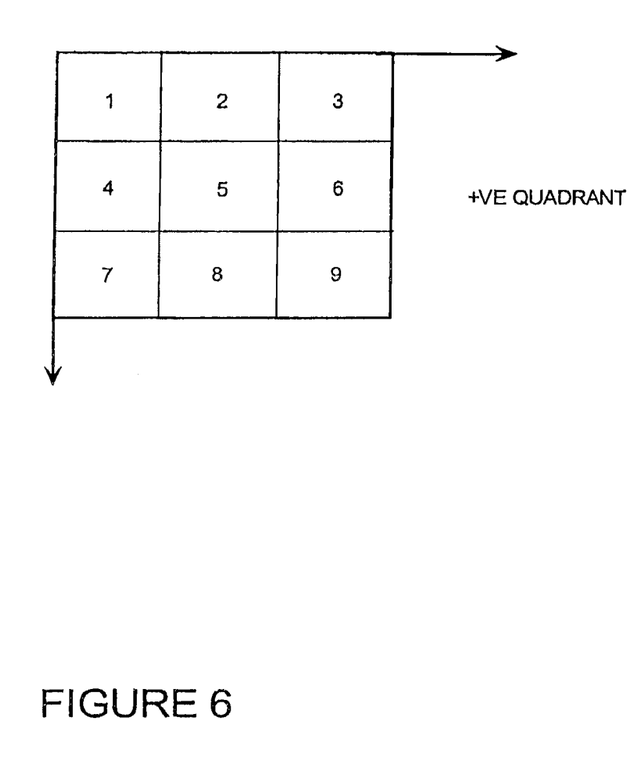
FIG. 6 presents a diagram of a default window manager console layout, in an embodiment of the invention.

The default window manager layout in the Photon event space is shown in FIG. 6. The display framework consists of "consoles" where console 5 is one console to the right, and one down, from console 1.

Figure 7:
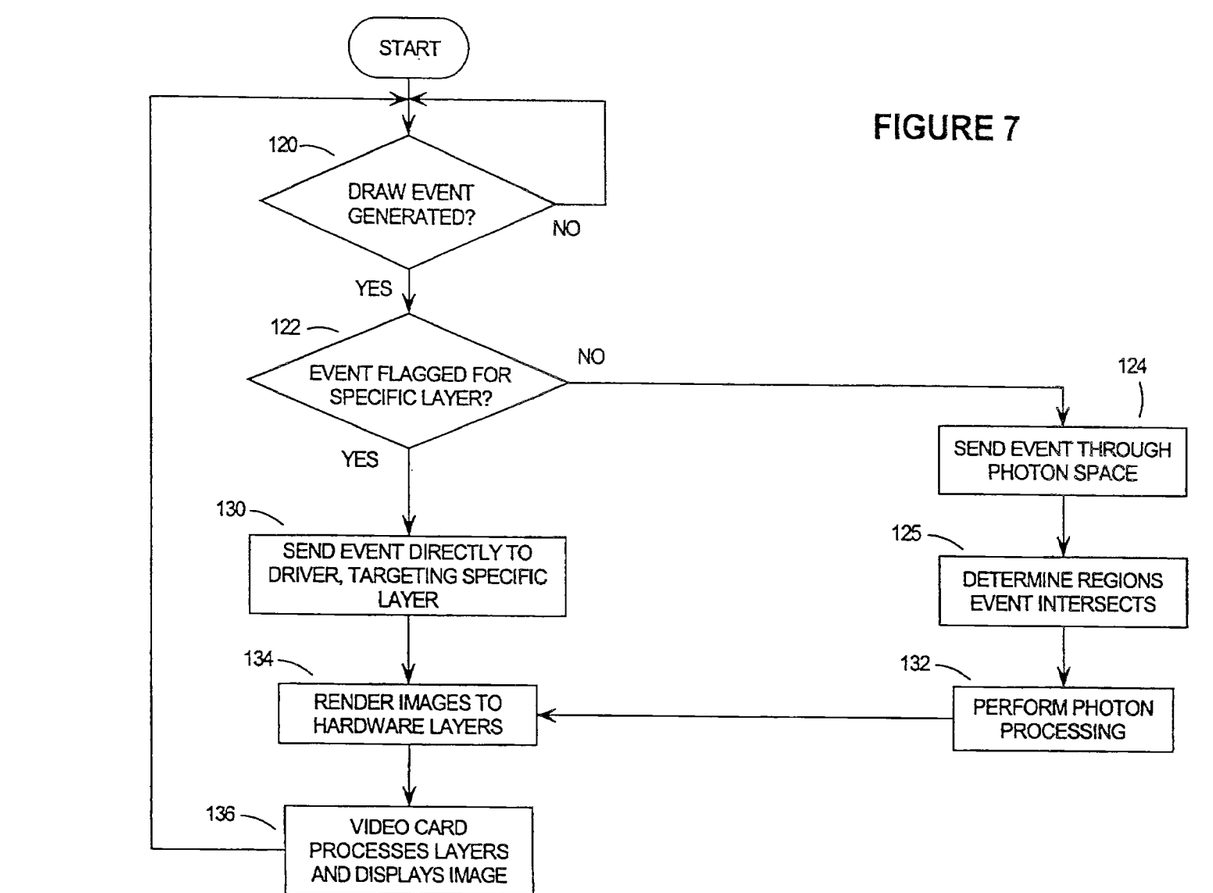
FIG. 7 presents a flow chart of a method of handling draw events, in an embodiment of the invention.

Once the system has been configured, draw requests can be processed in the manner presented in the flow chart of FIG. 7. This flow chart has been simplified to demonstrate the process flow, as opposed to being representative of how the actual software code would be structured. For example, a real implementation of an operating system would generally not include a "no" loop as shown with respect to step 120. Operating systems generally respond to the arrival of interrupts, the issuance of function calls, or the response to a periodic poll, rather than sitting in a processing loop waiting for a response. However, the actual software code implementation of the invention would be clear to one skilled in the art from the description of the invention In this simplistic manner.

When a draw event is received at step 120, or similarly, any request to render an image, vector or character to a physical display is received, control passes to step 122. At step 122, the routine determines whether the draw request is flagged for a specific video hardware layer. If it is not, then the draw event is sent through the Photon Event Space 80 per step 124. Such events are then delivered to regions within the Photon Event Space 80 at step 125. The determination of which regions a draw event will be assigned to is determined by the geometry of the source of the draw event. As noted above, it may be desirable, for example, to send alarm displays to regions which have higher priority than video images. In fact, it is necessary to be able to control to which surfaces/layers draw events end up affecting in order to implement a general layered interface.

If the draw event is identified at step 122 is to be directed to a specific video surface, then it is passed directly to a graphic region without having to travel through Photon space from the emitter region. As noted above with respect to step 108 of FIG. 5, it may be desirable to pass some draw requests directly to a particular hardware layer, thus avoiding the possibility of the draw request being blocked or modified by another Region. If the draw request is intended for the Photon Event Space 80, then control passes to step 124, while if the draw request is intended to go directly to a hardware layer, control passes to step 130.

At step 132, the entire Photon Event Space 80 is processed as described with respect to FIGS. 3 and 4. This results in the draw event being processed within the Photon Event Space 80 and possibly, being projected onto one or more graphic driver regions.

These graphic driver regions are associated with particular video hardware layers, and accordingly are rendered onto those video hardware layers at step 134. If the draw event had been passed to step 130, then it would simply be emitted directly to the driver region in Photon Event Space 80 bypassing all intervening regions between the source of the draw and the driver region and without regard to the geometry of the draw source or the receiving driver region. The draws are then rendered to the desired hardware layer 134.

At step 136, the video hardware layers are then processed by the graphics card and presented on the physical display screen. Control then returns to step 120, to await the arrival of further draw events.

A system arranged in such a manner allows third party software applications to exploit video hardware layers support in graphics cards, without even being aware that such hardware layers exist. Such a system could allow, for example, a television display to supports a computer display or email, in a pip (picture in picture) window. The email feature could be a standard, email application that the television displays on a separate layer to allow user configurable transparency control of the email application (so as not to too badly obscure the scores during a sporting event). Similarly, a stand alone mapping application could be put on one layer and automotive info (trip computer info, hvac settings, etc) could be displayed over the map with a minimum of impact on the microprocessor of the system.

While particular embodiments of the present invention have been shown and described, it is clear that changes and modifications may be made to such embodiments without departing from the true scope and spirit of the invention.

The method steps of the invention may be embodiment in sets of executable machine code stored in a variety of formats such as object code or source code. Such code is described generically herein as programming code or software code for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Microprocessors, digital signal processors (DSPs), microcontrollers and application specific integrated circuits (ASICs) are typical examples of devices which are capable of such execution. Similarly, electronic memory media such computer diskettes, CD-Roms, Random Access Memory (RAM), Read Only Memory (ROM) or similar computer software storage media known in the art, may be used to store the software code required to perform the methods of the invention. As well, electronic signals representing these method steps may also be transmitted via a communication network.

What is claimed is:

1. A method of accessing a plurality of hardware layers that are composited by a layering hardware, the method comprising:
determining, with a processor, which of the hardware layers are available by querying a first application programming interface;
associating, with the processor, a video surface with a hardware layer that is determined to be available, the hardware layers comprising the hardware layer;
receiving a draw stream from an application through a second application programming interface with the processor, the draw stream directed to the video surface; and
rendering the draw stream received at the second programming interface directly to the hardware layer with the processor without the application having knowledge of an existence of the hardware layer or the hardware layers.

2. The method of claim 1 further comprising determining, with the processor, capabilities of the hardware layers by querying the first application programming interface.

3. The method of claim 1, wherein the video surface is a chunk of memory.

4. The method of claim 1, wherein a plurality of video surfaces are combined with the layering hardware, the video surfaces including the video surface.

5. The method of claim 1 wherein the video surface is blended by the layering hardware.

6. The method of claim 1, wherein a plurality of video surfaces are combined non-destructively with the layering hardware, the video surfaces including the video surface.

7. The method of claim 1, wherein the second programming interface is a windowing system.

8. A computer-readable storage medium encoded with computer executable instructions, the computer executable instructions executable with a processor to access a plurality of hardware layers that are composited by a layering hardware, the computer-readable storage medium comprising:

instructions executable to determine which of the hardware layers are available in response to a query made through a first application programming interface;

instructions executable to associate a video surface with a hardware layer that is determined to be available, the hardware layers comprising the hardware layer;

instructions executable to receive a draw stream from an application through a second application programming interface, wherein the draw stream is directed to the video surface; and instructions executable to render the draw stream received at the second programming interface directly to the hardware layer without the application having knowledge of an existence of the hardware layer.

9. The computer-readable storage medium of claim 8, wherein the first and second programming interfaces are operating system programming interfaces.

10. The computer-readable storage medium of claim 8 further comprising instructions executable to provide information about the hardware layers to the application through the first programming interface.

11. The computer-readable storage medium of claim 8, wherein the video surface is a partitioned chuck of memory in the layering hardware.

12. The computer-readable storage medium of claim 8, wherein the video surface is composited by the layering hardware.

13. The computer-readable storage medium of claim 8, wherein the second programming interface is a window manager.

14. The computer-readable storage medium of claim 8, wherein the draw stream comprises a draw event.

15. The computer-readable storage medium of claim 8, wherein the draw stream comprises a request by the application to render at least one of an image, a vector, or a character.

* * * * *